United States Patent
Jin et al.

(10) Patent No.: US 7,663,715 B2
(45) Date of Patent: Feb. 16, 2010

(54) BACK LIGHT ASSEMBLY AND TILED DISPLAY DEVICE HAVING THE SAME

(75) Inventors: Hyun Suk Jin, Gyeonggi-Do (KR); Min Joo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/168,990

(22) Filed: Jun. 29, 2005

(65) Prior Publication Data

US 2006/0007369 A1 Jan. 12, 2006

(30) Foreign Application Priority Data

Jun. 30, 2004 (KR) .................. 10-2004-0050814

(51) Int. Cl.
*G02F 1/133* (2006.01)
*G02F 1/1333* (2006.01)
*F21V 7/04* (2006.01)

(52) U.S. Cl. ................... 349/73; 349/58; 362/606; 362/617

(58) Field of Classification Search ............. 349/58, 349/73; 362/606, 617
See application file for complete search history.

(56) References Cited

U.S. PATENT DOCUMENTS

| 4,980,755 A | 12/1990 | Ozaki |
| 5,067,021 A | 11/1991 | Brody |
| 5,068,740 A | 11/1991 | Brody |
| 5,079,636 A | 1/1992 | Brody |
| 5,394,308 A * | 2/1995 | Watanabe et al. ........... 362/613 |
| 5,664,873 A * | 9/1997 | Kanda et al. ............... 362/97 |
| 5,796,450 A * | 8/1998 | Kanda et al. ............... 349/64 |
| 5,797,668 A * | 8/1998 | Kojima et al. ............. 362/618 |
| 6,483,482 B1 * | 11/2002 | Kim ....................... 345/3.1 |
| 6,927,908 B2 * | 8/2005 | Stark ..................... 359/449 |
| 2002/0003592 A1 * | 1/2002 | Hett et al. ................ 349/58 |
| 2003/0231144 A1 * | 12/2003 | Cho et al. ................ 345/1.3 |
| 2006/0077544 A1 * | 4/2006 | Stark ..................... 359/448 |

* cited by examiner

Primary Examiner—David Nelms
Assistant Examiner—Lauren Nguyen
(74) Attorney, Agent, or Firm—Morgan Lewis & Bockius LLP

(57) ABSTRACT

A tiled display device includes a plurality of display devices defining an image display part, the image display part divided into a central portion and an outer edge portion, a support frame tiling the plurality of display devices side by side, and a plurality of light guides, each light guide disposed on each of the display devices, wherein the brightness of an image displayed at the outer edge portion is higher than that of an image disposed at the central portion.

6 Claims, 5 Drawing Sheets

BACK LIGHT ASSEMBLY AND TILED DISPLAY DEVICE HAVING THE SAME

The present invention claims the benefit of Korean Patent Application No. 10-2004-0050814 filed in Korea on Jun. 30, 2004, which is hereby incorporated by reference.

BACKGROUND OF THE INVENTION

1. Field of the Invention

The present invention relates to a display device, and particularly, to a tiled display device capable of achieving uniform brightness over an entire area of a large display screen.

2. Discussion of the Related Art

With the increase in popularity of visual information transmitting devices, electronic display devices have been actively developed and researched. A liquid crystal display (LCD) device, one of the electronic display devices, is in great demand because it is slim, lightweight and efficient in power-consumption. Also, with the improvement in living standards, an LCD device with a large size and high image quality has lately attracted considerable attention.

There are limitations to how large the LCD screen can be because of the characteristics of the LCD device. For this reason, a projection TV having an optical system with a small liquid crystal panel and implementing a large image on a screen by magnifying and projecting an image on the screen has been proposed. Recently, a tiled LCD device in which a plurality of LCD devices are tiled together with their side surfaces contacting each other to form a large size display device is being put to practical use. As disclosed in U.S. Pat. Nos. 4,980,755, 5,067,021, 5,068,740 and 5,079,636, a tiled LCD device is fabricated by tiling at least two liquid crystal panels side by side. The key to a technology for fabricating such a tiled LCD device is to prevent boundary lines between a plurality of LCD devices from being displayed on a screen.

In general, the tiled display device is formed by fixing a plurality of display devices to a support frame. Here, each display device serves as one unit when a backlight assembly, a display panel, a polarization member, and the like are attached thereto. The support frame includes an outer wall frame, a partition wall frame interposed between the plurality of display devices and a bottom plate receiving the partition wall frame and the display devices. Here, each display device is received in a space formed by the partition wall frame and the outer wall frame and is thus tiled.

However, in a large screen formed through the aforementioned tiling technology, since an image is not formed at a partition wall frame area, a boundary display phenomena, namely, a seam phenomenon (artificial boundary), occurs in that a boundary line between the display devices is displayed on the screen along the partition wall frame. Thus, an entirely-unified image cannot be displayed. Accordingly, in order to prevent a seam line from being displayed at a seam area between display devices, namely, at a support frame area, a method of preventing seam phenomena has been proposed by guiding light emitted from the display panels of the display devices and thus extending a path of the light to an upper portion of the support frame. In this method, a light-guide lens is employed to guide the light.

The light-guide lens is made of glass or transparent plastic having good light transmittance. Also, the light-guide lens is shaped as a triangular prism or a semi-circular cylinder, a portion of which has a predetermined curvature. Such a light-guide lens is installed in close proximity to an upper portion of the display device and diffuses light having passed through the display device up to a screen of a tiled display device having a large screen.

However, in the tiled display device, a path of light having passed through a curved (rounded) portion of the light-guide lens is diffused because of distortion of the curved portion, thereby implementing an image over a seam area. Here, problems occur in that the brightness above the seam area is lower than the average brightness of a panel because of the diffusion of light. Therefore, a device for solving the problems of non-uniform brightness and achieving entirely uniform brightness distribution is required.

SUMMARY OF THE INVENTION

Accordingly, the present invention is directed to a tiled display device that substantially obviates one or more of the problems due to limitations and disadvantages of the related art.

An object of the present invention is to provide a tiled display device that is able to remove visual distinction between a seam area (artificial boundary) and the rest of the area by providing each display device with an appropriate compensation device for preventing seam phenomena from occurring due to a structural anomaly of a tiled display device.

Another object of the present invention is to provide a large tiled display device capable of implementing uniform brightness over an entire area of a screen by varying prism angles of a prism sheet and light diffusion patterns of a light-guide plate according to areas, wherein the prism sheet and the light-guide plate constitute a backlight assembly of a display device.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, the tiled display device includes a plurality of display devices defining an image display part, the image display part divided into a central portion and an outer edge portion, a support frame tiling the plurality of display devices side by side, and a plurality of light guides, each light guide disposed on each of the display devices, wherein the brightness of an image displayed at the outer edge portion is higher than that of an image disposed at the central portion.

In another aspect, the tiled display device includes a plurality of display devices including a display panel and a backlight assembly supplying light to the display panel, a support frame tiling the plurality of display devices side by side, and a plurality of light guides, each disposed on each of the display devices, wherein light having transmitted the plurality of light guides have the uniform brightness.

In still another aspect, the tiled display device includes a plurality of display panels defining an image display part, a support frame tiling the plurality of display panels side by side, a light-guide lens disposed on the image display part, wherein a flat portion and a curved portion are formed at one surface of the light-guide lens; a lamp generating light, a light-guide plate including light diffusion patterns therein, wherein distribution of the light diffusion patterns is varied according to areas where the patterns are formed; and a prism sheet disposed on the light-guide plate and including a plurality of prisms, wherein prism angles of the plurality of prisms are varied according to areas.

In still another aspect, an edge type backlight assembly includes a lamp generating light, a light-guide plate including light diffusion patterns therein, wherein a distribution density of the light diffusion patterns is varied according to areas where the patterns are formed, and a prism sheet disposed on the light-guide plate and including a plurality of prisms, wherein prism angles of the plurality of prisms are varied according to areas.

In still another aspect, a direct type backlight assembly includes a plurality of lamps arranged parallel to a rear surface of a display panel and generating light, and a frame of a transparent material, the frame supporting the lamps, wherein a distribution density of the lamps is varied within the frame according to areas.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
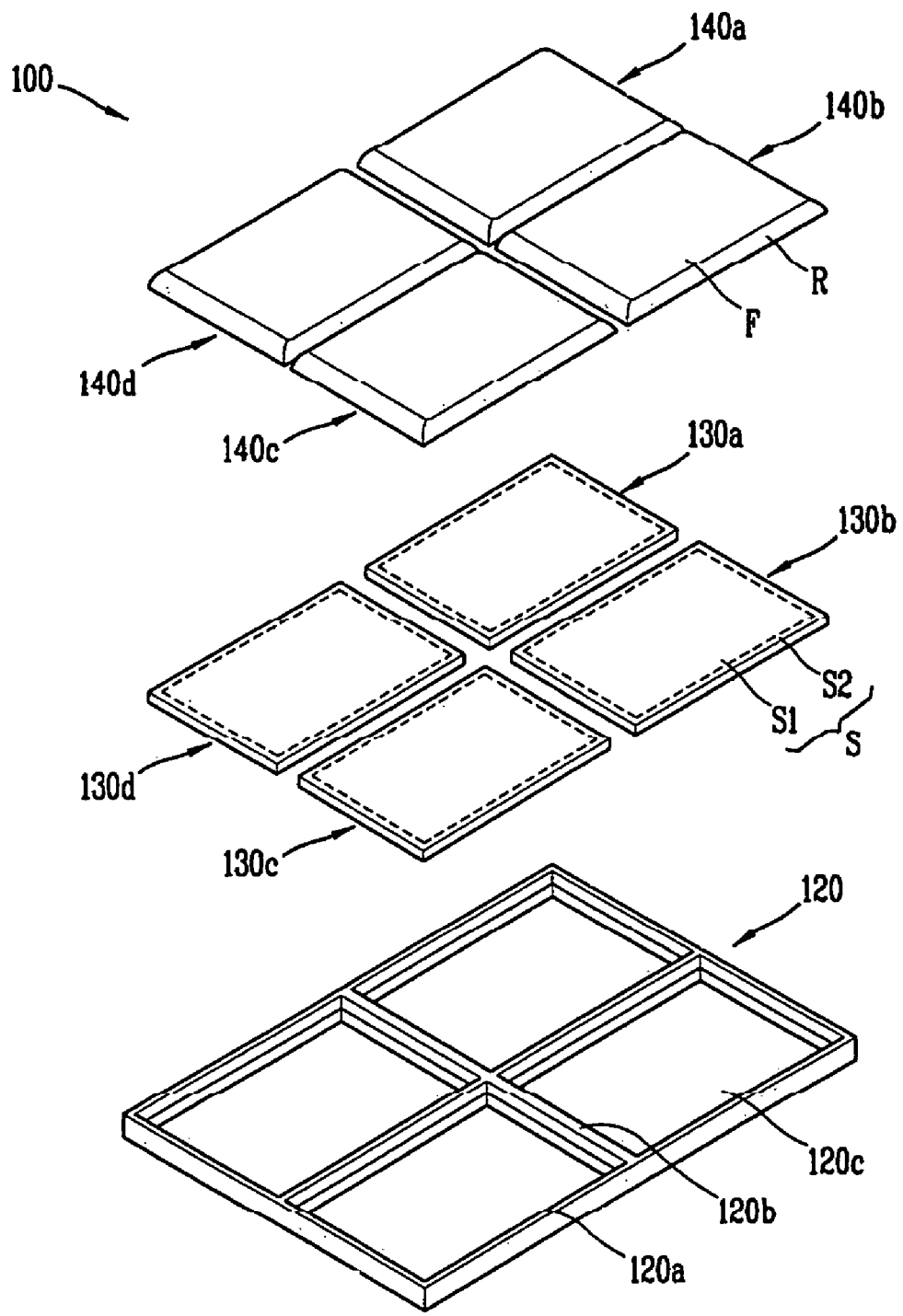
FIG. 1 is a schematic exploded perspective view illustrating a tiled display device including a plurality of display devices in accordance with an exemplary embodiment of the present invention.

FIG. 1 is a schematic exploded perspective view illustrating a tiled display device 100 in accordance with an exemplary embodiment of the present invention. As shown in FIG. 1, the tiled display device 100 is formed such that a plurality of display devices 130a-130d are fixed and tiled side by side by a support frame 120. Here, the plurality of display devices 130a-130d have light guides 140a-140d formed thereon, respectively.

The support frame 120 includes an outer wall frame 120a forming an outer wall frame, a partition wall frame 120b interposed between the display devices 130a-130d, and a bottom plate 120c receiving the light guides 140a-140d and the display devices 130a-130d. Each of the display devices 130a-130d is received in a space formed by the partition wall frame 120b and the outer wall frame 120a. An image display part (S) implementing an image is defined at each of the display devices 130a-130d, and the image display part (S) is divided into a central portion (S1) and an outer edge portion (S2). Here, the brightness of an image displayed at the outer edge portion (S2) is higher than that of an image displayed at the central portion (S1).

Figure 2:
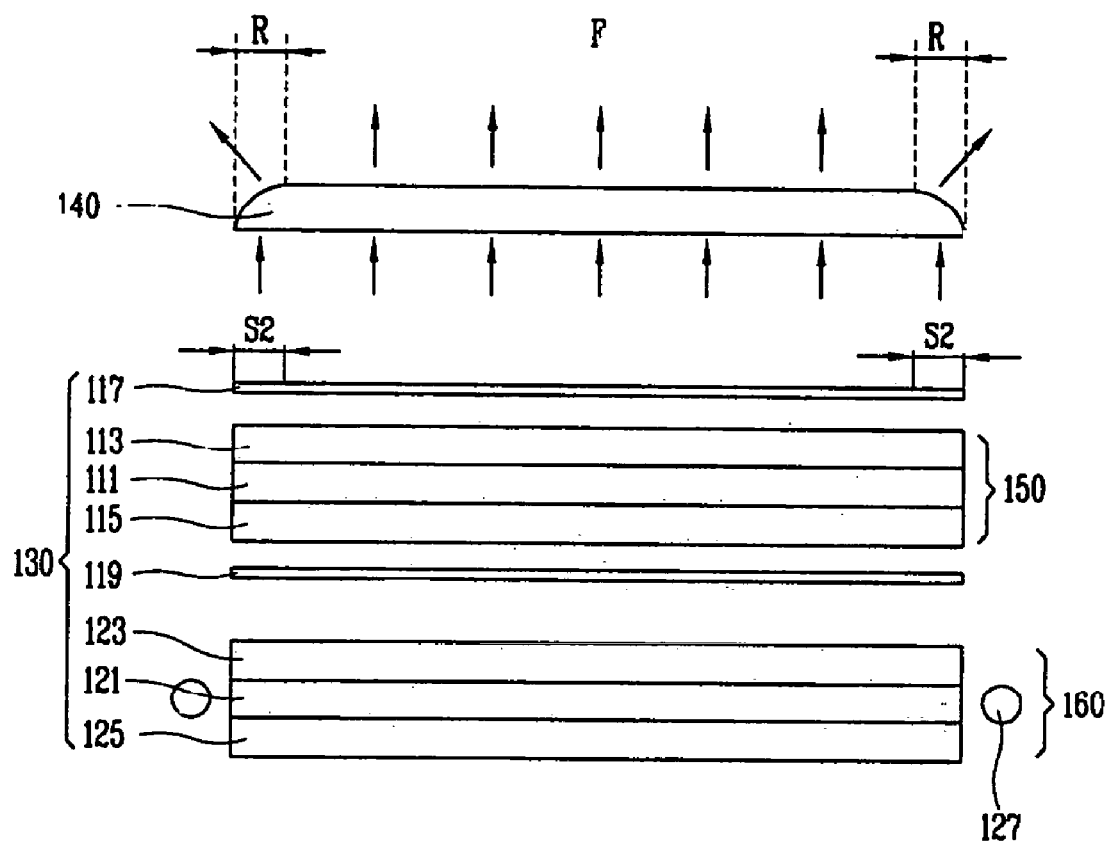
FIG. 2 is a sectional view showing a display device and a light guide in accordance with an exemplary embodiment of the present invention.

As shown in FIG. 2, each of the light guides 140a-140d may be a light-guide lens 140 having a flat portion (F) and a curved portion (R). The light-guide lens 140 is disposed on each of the display devices 130a-130d. In this exemplary embodiment, the flat portion (F) of the light-guide lens 140 corresponds to the central portion (S1), and the curved portion (R) corresponds to the outer edge portion (S2). Also, each of the display devices 130a-130d is an LCD device and includes a liquid crystal panel 150 in which pixels are arranged in a matrix configuration and a back light assembly 160 irradiating light to the liquid crystal panel 150. The liquid crystal panel 150 includes a first substrate 115 and a second substrate 113 facing each other, and a liquid crystal layer 111 formed between the first and second substrates 115 and 113. An upper polarization plate 117 and a lower polarization plate 119 are provided at upper and lower surfaces of the liquid crystal panel 150, respectively.

The first substrate 115 may be a thin film transistor array substrate. A plurality of gate lines and a plurality of data lines are formed on the first substrate 115, and pixels are defined by the intersection of the gate lines and the data lines. A thin film transistor for switching a corresponding pixel is formed at each intersection of the gate line and the data line, and a pixel electrode for driving a liquid crystal of the liquid crystal layer 111 is formed within each pixel.

The second substrate 113 is a color filter substrate. A color filter layer for implementing actual colors and a black matrix for preventing leakage of light to upper portions of the gate line, the data line and the thin film transistor region are formed on the second substrate 113. Also, a common electrode for driving liquid crystal molecules by generating an electric field together with the pixel electrode is formed on the color filter layer.

In such an arrangement of this exemplary embodiment, when a voltage of a data signal applied to the pixel electrode is controlled in a state in which a voltage has been applied to the common electrode, the liquid crystal of the liquid crystal layer 111 is rotated by a dielectric anisotropy along an electric field between the common electrode and the pixel electrode, thereby transmitting or blocking light by each pixel and thus displaying characters and images. Here, the common electrode may be formed on the same plane (e.g., the first substrate 115) of the pixel electrode. If the common electrode and the pixel electrode are formed on the same substrate, a horizontal electric field that is parallel to the substrate is generated, and thus the liquid crystal is driven in a state in which a direction of the liquid crystal is parallel to the substrate, so that a viewing angle of the display device is improved.

A backlight assembly 160 is provided at a rear surface of the liquid crystal panel 150 to supply light to the liquid crystal panel 150. The backlight assembly 160 includes a lamp 127 generating light, a light-guide plate 121 having a wedge structure, converting light incident thereonto from the lamp 127 into a surface light source and guiding the surface light source toward the liquid crystal panel 150, an optical sheet 123 attached to an upper portion of the light-guide plate 121 to improve utilization efficiency of light incident toward the liquid crystal panel 150, and a reflecting plate 125 attached to a rear surface and a side surface of the light-guide plate 121 and reflecting to the liquid crystal panel 150, light emitted to a rear surface of the light-guide plate 121.

The optical sheet 123 is disposed between the light-guide plate 121 of the backlight assembly 160 and the liquid crystal panel 150, and includes a diffusion sheet, a prism sheet and a protection sheet. The diffusion sheet disperses light incident thereon from the light-guide plate 121 and thus prevents non-uniform brightness of light from occurring due to non-uniform light concentration, thereby achieving uniform brightness over an entire area of the liquid crystal panel 150. The prism sheet totally reflects to the light-guide plate 121 light incident thereon from the diffusion sheet at a specific angle or more, and sends and concentrates to a central portion light incident thereon at an angle smaller than the specific angle, thereby distributing the light to an entire surface of the liquid crystal panel 150. Two prism sheets collecting light vertically and horizontally may also be used. The protection sheet protects the optical sheet 123 that is sensitive to dust or scratches, prevents a movement of the optical sheet 123 when the backlight assembly 160 is carried, and more uniformly distributes light by diffusing light incident thereon from the prism sheet.

A light-guide lens 140 is disposed on the display device 130 and diffuses an image displayed on the display device 130, thereby preventing seam phenomena from occurring at an image non-display area (i.e., support frame area) between the display devices 130a-130d. In other words, as shown in FIG. 2, in order to prevent visual observation of a seam line between the display devices 130a-130d, which necessarily occurs as the display devices 130a-130d are tiled, light (↑) coming out from an outer edge portion (S2) of the display device 130 changes its path to right and left sides while passing through a curved portion (R) of the light-guide lens 140, thereby spreading over the seam area. In such an arrangement, a screen of the display device 130, while is maintained, substantially divided at certain regular intervals, appears to be continued without seams.

However, since the light having passed through the curved portion (R) of the light-guide lens 140 implements an image enlarged by distortion of the curved portion (R) over the seam area, the brightness above the seam area is lower than the average brightness of the liquid crystal panel 150, thereby deteriorating the uniformity of the brightness over an entire screen of the tiled display device 130. Thus, by designing the display device to increase the brightness in an area corresponding to the outer edge portion (S2), namely, in an area corresponding to the curved portion (R) of the light-guide lens 140, the exemplary embodiment of the present invention obtains an effect of making the brightness of an image implemented above the seam area the same as the average brightness of an entire screen.

Figure 3A:
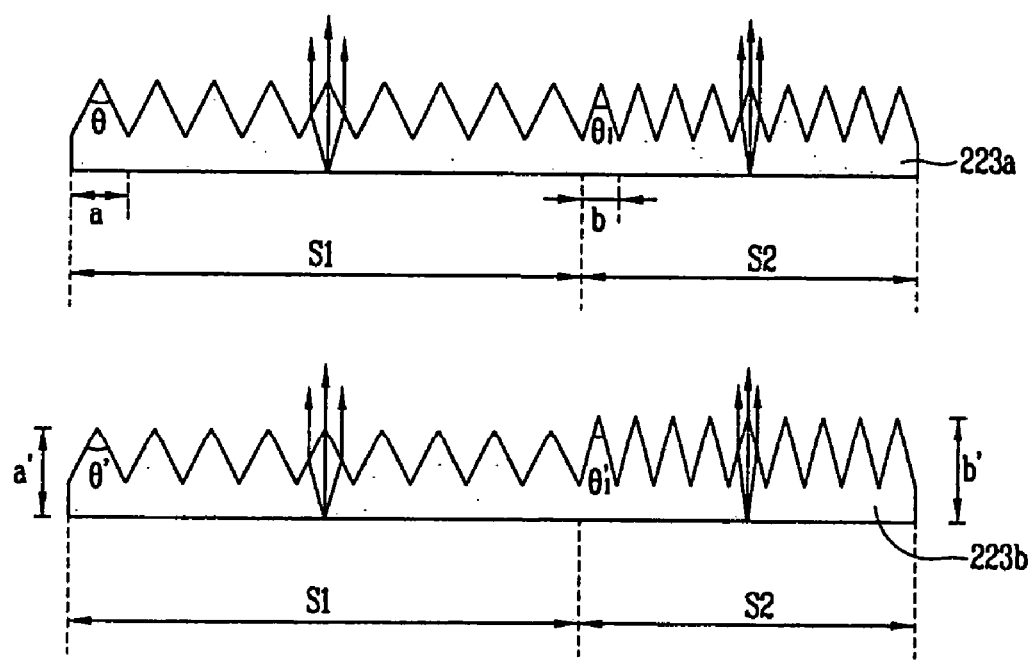
FIGS. 3A and 3B are sectional views each showing a prism sheet in accordance with an exemplary embodiment of the present invention.

FIG. 3A shows two prism sheets of the backlight assembly for achieving the aforementioned object according to an exemplary embodiment of the present invention. As shown in FIG. 3A, prism sheets 223a and 223b respectively have different angles according to their positions. Specifically, for example, angles ($\theta_1$, $\theta_1'$) of the prism sheets 223a and 223b located corresponding to the outer edge portion (S2) of the display device are smaller than angles ($\theta$, $\theta'$) of the prisms sheets 223a and 223b located corresponding to the central portion (S1). Consequently, the light (↑) passing through a prism disposed at the outer edge portion (S2) is more densely concentrated, so that the intensity of light is increased in the outer edge portion (S2) and the brightness is improved.

In FIG. 3A, the first prism sheet 223a is a prism sheet in accordance with one exemplary embodiment of the present invention. As shown, the number of prisms per a unit area corresponding to the outer edge portion (S2) of the display device is greater than that of a unit area corresponding to the central portion (S1), thereby decreasing an interval between the prisms located corresponding to the outer edge portion (S2) from 'a' to 'b', namely, by (a-b). Accordingly, the angle $\theta_1$ of the prism located corresponding to the outer edge portion (S2) becomes smaller than the angle $\theta$ of the prism located corresponding to the central portion (S1) of the display device. As a result, the density of light (↑) irradiated to the curved portion R of the light-guide lens 140 is increased, thereby obtaining an effect of improving the brightness in the outer edge portion (S2).

The second prism sheet 223b of FIG. 3A is a prism sheet in accordance with another exemplary embodiment of the present invention. In this exemplary embodiment, a height (b') of the prism located corresponding to the outer edge portion (S2) of the display device is higher than a height (a') of the prism located corresponding to the central portion (S1). Accordingly, the prism angle ($\theta_1'$) in an area corresponding to the outer edge portion (S2) becomes smaller than the prism angle ($\theta'$) in an area corresponding to the central portion (S1). Such a principle may be applied to a prism light-guide plate in the same manner. Specifically, a prism angle in an area corresponding to a curved portion of the light-guide lens is smaller than a prism angle in an area corresponding to the flat portion of the light-guide lens, thereby obtaining the aforementioned effect.

If a tiled display device is fabricated such that a plurality of display devices are only tiled at their right and left sides, only one of the two prism sheets inserted in the display device, which horizontally concentrates light, may have the structure shown in FIG. 3A in accordance with the exemplary embodiment of the present invention. If the tiled display device is fabricated such that a plurality of display devices are tiled at every side, both of the two prism sheets inserted in each display device may have the structure of FIG. 3 in accordance to the exemplary embodiment of the present invention. Such a structure is utilized even when one of the two prism sheets is not used but a prism light-guide plate is utilized instead.

Figure 3B:
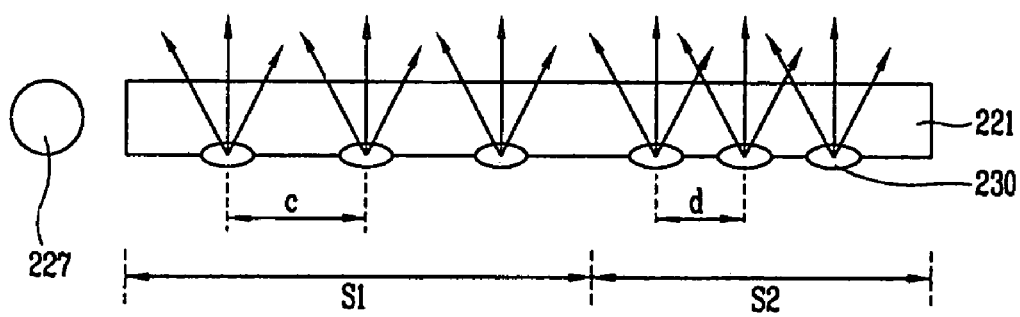

In a tiled display device in accordance with another exemplary embodiment of the present invention, as shown in FIG. 3B, a distribution density of light diffusion patterns 230 may be increased in an area of a light-guide plate 221 corresponding to the outer edge portion (S2) in order to increase the brightness of the outer edge portion (S2) of each individual display device constituting the tiled display device. The light diffusion patterns 230 may be made of a high molecular resin such as PMMA or the like. The light diffusion patterns 230 diffuse light incident onto a side surface of the light-guide plate 221 from a lamp 227 and sends the light to an upper optical sheet such as a prism sheet or the like. Accordingly, an average distance (d) between light diffusion patterns 230 corresponding to the outer edge portion (S2) is smaller than an average distance (c) between light diffusion patterns 230 corresponding to the central portion (S1), and therefore the diffused light is concentrated and brightness is partially increased.

Figure 4:
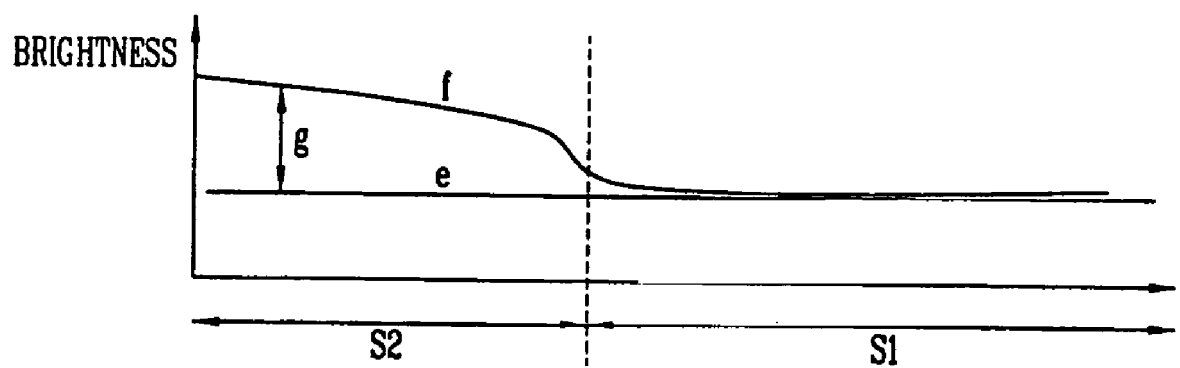
FIG. 4 is a graph showing a comparison between brightness of light reaching a light-guide lens of a tiled display device in accordance with an exemplary embodiment of the present invention and brightness of light reaching a light-guide lens of a conventional tiled display device.

FIG. 4 is a graph showing a difference between brightness (e) of light reaching a light-guide lens in a conventional tiled display device and brightness (f) of light reaching the light-guide lens 140 in the tiled display device 130 in accordance with the exemplary embodiment of the present invention. As shown in FIG. 4, the brightness (f) of light irradiated to the light-guide lens 140 of the tiled display device 130 is different between a flat portion (F) and a curved portion (R). Here, the brightness is higher at the curved portion (R) than at the flat portion (F). In other words, unlike the conventional tiled display device in which the brightness (e) of light reaching the light-guide lens after passing through a display device is constant over an entire area of the light-guide lens, the tiled display device 130 in accordance with the exemplary embodiment allows the brightness of light irradiated to the curved portion (R), namely, the brightness of light coming out from the outer edge portion of the display device 130, to be higher than that of light irradiated to the flat portion (F) of the light-guide lens 140. Accordingly, the brightness of an image extending over a seam area between display devices does not become smaller than an average value. As a result, the uniform brightness can be obtained over an entire screen of the tiled display device.

Figure 5A:
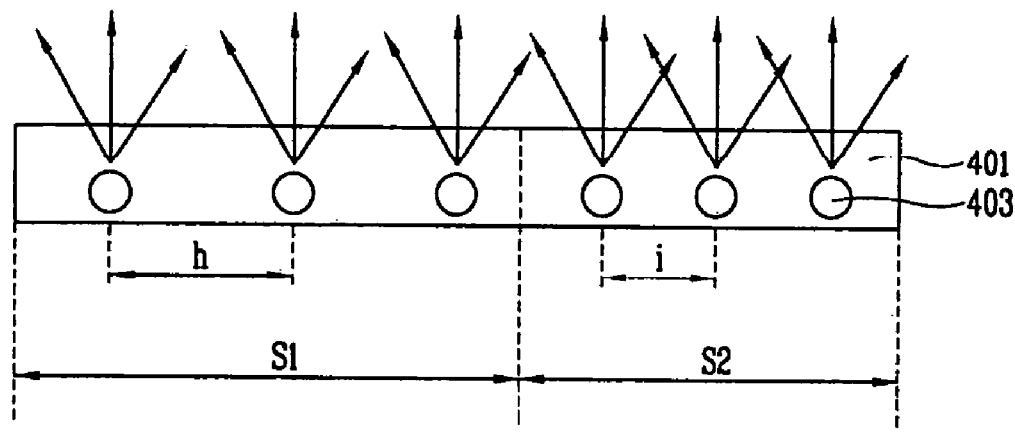
FIGS. 5A and 5B are sectional views illustrating a direct type backlight assembly in accordance with an exemplary embodiment of the present invention.
Figure 5B:
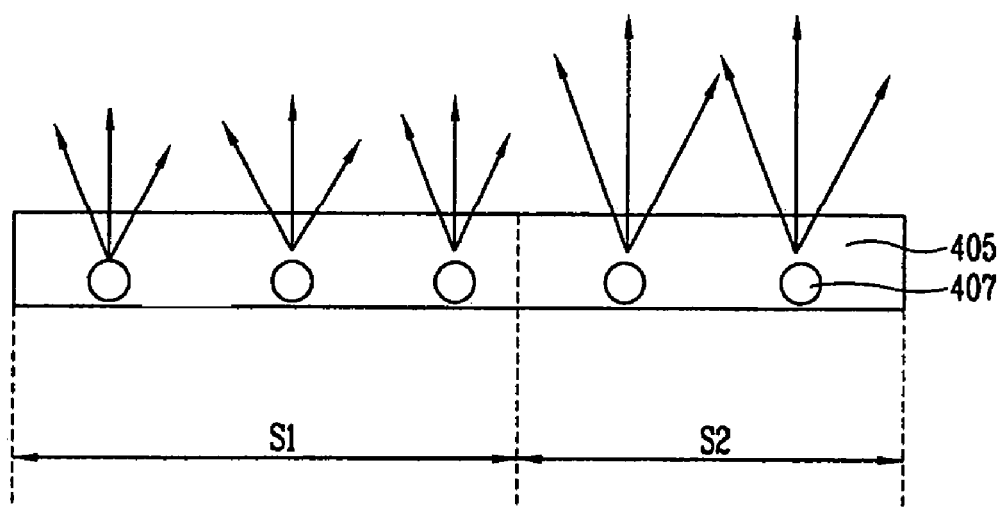

In short, the present invention aims to increase brightness of an image (i.e., light) implemented especially on a seam area in order to achieve uniform brightness over an entire screen of a tiled display device. To this end, brightness of light coming out from the outer edge portion of a display device is increased. Such a principle is applied not only to an edge type backlight assembly in accordance with the aforementioned exemplary embodiments but also to a direct type backlight assembly. For example, as shown in FIG. 5A, a plurality of lamps 403 are arranged parallel to the display device within a transparent frame 401 disposed at a rear surface of a display device. Here, an interval (i) between lamps 430 located corresponding to an outer edge portion (S2) of a display device is narrower than an interval (h) between the lamps 430 located corresponding to a central portion (S1), thereby increasing a distribution density of lamps 430 in an area corresponding to the outer edge portion (S2). Accordingly, the brightness in the corresponding area is increased. On the other hand, as shown in FIG. 5B, a lamp current of lamps 407 located corresponding to an outer edge portion (S2) is relatively increased compared to that of the lamps 407 located corresponding to a central portion (S1), thereby more improving the brightness of the outer edge portion (S2).

The aforementioned exemplary embodiments are merely examples in which a light-guide lens serves as a light guide to implement a seamless screen in a tiled display device. One object of the present invention is to partially increase brightness of the display device by varying prism angles of a prism sheet and a prism light-guide plate constituting a back light assembly and also varying light diffusion patterns formed in a light-guide plate according to areas, and by controlling a density of lamps utilized in a direct type backlight assembly and the intensity of current. However, the present invention is not limited to a tiled display device utilizing a light-guide lens as a light guide. In other words, even when an optical fiber is used as a light guide, the arrangement in accordance with the exemplary embodiments of the present invention may be used therein in order to increase the brightness of light applied to a seam area between display devices.

It will be apparent to those skilled in the art that various modifications and variations can be made in tiled display device of the present invention without departing from the spirit or scope of the invention. Thus, it is intended that the present invention cover the modifications and variations of this invention provided they come within the scope of the appended claims and their equivalents.

What is claimed is:

1. A tiled display device comprising:
   a plurality of display devices having an image display part and a non-image display part, the image display part including a central portion and an outer edge portion;
   a support frame tiling the plurality of subsidiary display devices side by side, the display devices being separated by the support frame;
   a backlight assembly supplying light to the display device; and
   a plurality of light guides, each light guide disposed on each of the image display parts of the plurality of display devices, the light guide diffusing the light from the backlight assembly to guide the light into a separated area between the display devices so that the image is displayed in the separated area between the display devices, the light guide includes a light-guide lens, the light guide lens having a curved portion corresponding to the outer edge portion of the image display part and a flat portion corresponding to the central portion of the image display part so that the whole area of light guide lens is corresponding to the image display part of the display device,
   wherein the brightness of the light in the outer edge portion of the image display part is larger than that in the central portion, so that the brightness of the image through the light guides in the separated area between the display devices is substantially same with the average brightness in the whole area of the display device.

2. The device of claim 1, further comprises:
   a display panel including first and second substrates.

3. The device of claim 2, wherein the display panel is a liquid crystal panel including:
   a plurality of gate lines and a plurality of data lines disposed and intersecting each other on the first substrate to define pixel regions;
   a thin film transistor formed at each intersection of the gate line and the data line;
   at least one common electrode and at least one pixel electrode generating an electric field at the pixel regions;
   a color filter layer formed on the second substrate; and
   a liquid crystal layer formed between the first and second substrates.

4. The device of claim 2, wherein the backlight assembly includes:
   a lamp generating light;
   a light-guide plate including light diffusion patterns;
   a reflecting plate disposed at a rear surface of the light-guide plate; and
   a prism sheet disposed on the light-guide plate and including a plurality of prisms.

5. The device of claim 4, wherein the plurality of prisms include a first group of prisms positioned corresponding to the seam area and a second group of prisms positioned corresponding to the central portion, a prism angle of the first prism being smaller than that of the second prism.

6. The device of claim 5, wherein the first group of prisms are more densely arranged than the second group of prisms.

* * * * *